(No Model.)
C. P. STEINMETZ.
SYSTEM OF ELECTRICAL DISTRIBUTION.
No. 605,525. Patented June 14, 1898.
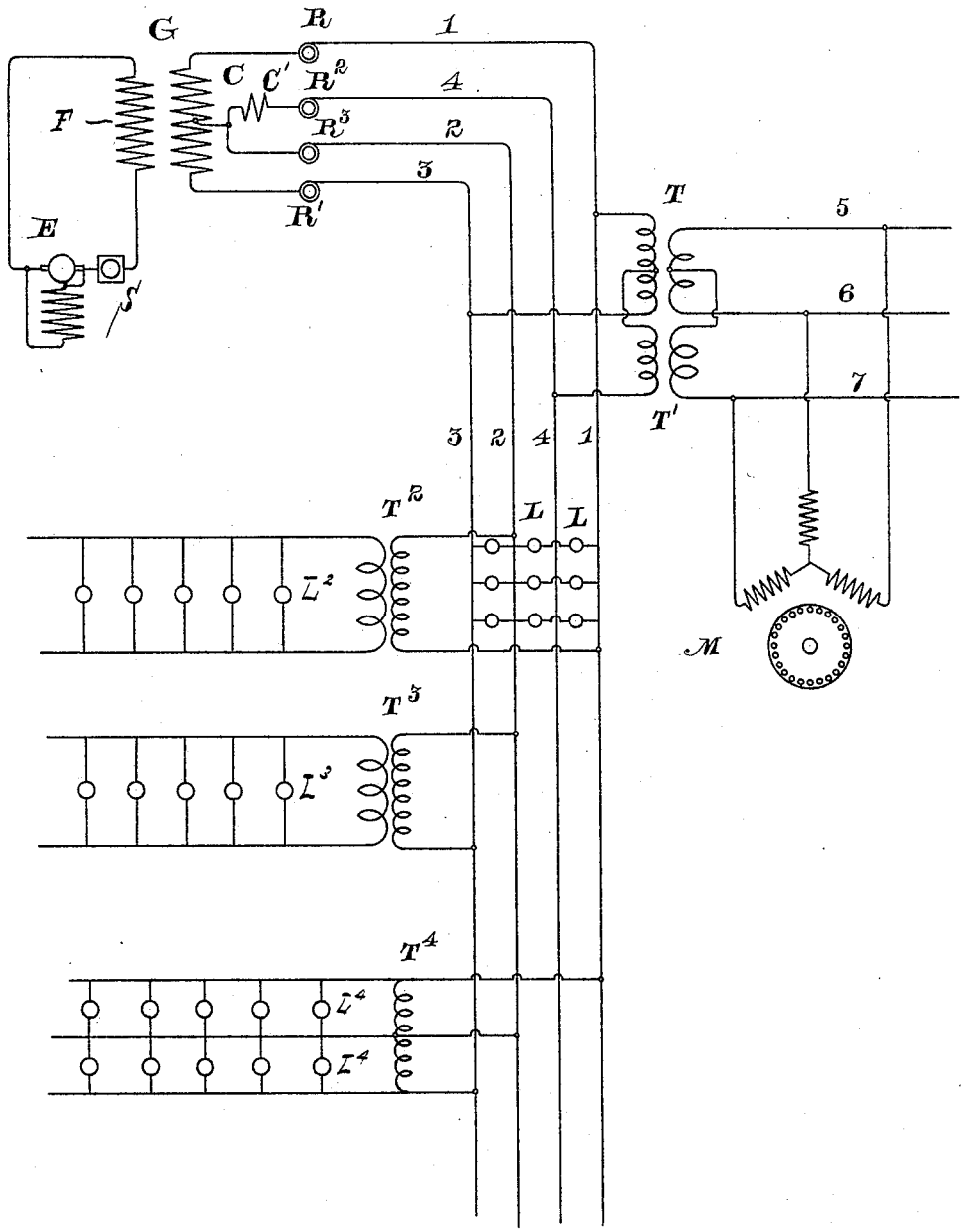
Witnesses:
A. F. Macdonald.
B. B. Hull.
Inventor:
Charles P. Steinmetz
By Geo. R. Blodgett
Atty.

UNITED STATES PATENT OFFICE.

CHARLES P. STEINMETZ, OF SCHENECTADY, NEW YORK, ASSIGNOR TO
THE GENERAL ELECTRIC COMPANY, OF NEW YORK.

SYSTEM OF ELECTRICAL DISTRIBUTION.

SPECIFICATION forming part of Letters Patent No. 605,525, dated June 14, 1898.

Application filed January 28, 1895. Serial No. 536,441. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Systems of Electrical Distribution, of which the following is a specification.

In an application for Letters Patent, Serial No. 641,130, filed June 17, 1897, I have described and illustrated certain improvements in systems of electrical distribution whereby light and power may be efficiently and economically supplied from the same generator.

In the present application, which is to be considered as specific under my above-mentioned former application, I aim to cover specifically one of the forms shown in the said application.

The drawing attached to this specification shows a diagram of my improved system of distribution.

In the drawing, G is a monocyclic generator, having its field-winding F supplied with current from the exciter E through the controlling-rheostat S, as usual. The induced member is wound with the main winding C and with the auxiliary winding C', connected at one end to an intermediate point in the main winding. The winding C' is so mounted on the induced member as to be the seat of an electromotive force displaced from the electromotive force of the main winding.

The terminals of the main armature-winding C are connected to the rings R R', while the terminal of the auxiliary winding C', which is connected to an intermediate point in the main winding C, is also connected to the ring $R^3$. The other terminal of the coil C' is connected to the ring $R^2$. From the rings R, $R^2$, $R^3$, and R' lead wires (numbered 1 4 2 3, respectively) to the distribution system.

It will be seen that the wires 1 2 3 form a three-wire single-phase system, of which 2 is the neutral wire and 1 and 3 the outside wires. I may therefore place lamps L L on the three-wire system in the usual manner and may place other lamps $L^2 L^3 L^4$ in the secondaries of the transformers $T^2 T^3$ or across the compensator $T^4$, connected to the three-wire system. It will be noticed that I have shown the primary of the transformer $T^2$ connected across one side of the three-wire system—namely, between the wires 1 and 2—while the primary of the transformer $T^3$ is connected across the other side of the three-wire system between the wires 2 and 3. The compensator $T^4$ is a three-wire compensator connected to all three of the mains of the three-wire system. It will be seen that my invention attains all the economy of copper characteristic of the three-wire system of distribution.

The fourth or supplementary wire 4 is obviously the seat of an electromotive force displaced in phase from the electromotive force of the three-wire system and may therefore be used in connection with either two of the wires of the three-wire system for running motors or other multiphase devices.

I assume that the generator G is so proportioned that there is a difference of phase of substantially sixty degrees between the main 4 and the mains 1 and 3, as is the case with the monocyclic generators now in use. The transformer T is connected across the mains 1 3, while one terminal of the transformer T' is connected to an intermediate point in the primary of the transformer T, while its other terminal is connected to the main 4. The secondaries of these transformers are so arranged that a difference of phase of one hundred and twenty degrees suitable for driving a three-phase motor M exists between the electromotive forces of the mains 5 6 7.

It will be seen that by my improvements I am able to gain in a single system the advantages of the monocyclic system of distribution and of the three-wire system of distribution.

I claim as my invention and desire to secure by Letters Patent—

A dynamo-electric machine, having out-of-phase coils connected to three collector-rings, and the remaining terminal of one coil connected to an intermediate point in the second coil, and a fourth collector-ring likewise connected to the intermediate point in the last-named coil.

In witness whereof I have hereunto set my hand this 19th day of January, 1895.

CHARLES P. STEINMETZ.

Witnesses:
   B. B. HULL,
   A. F. MACDONALD.